(12) United States Patent
Yamazaki et al.

(10) Patent No.: US 8,678,507 B2
(45) Date of Patent: Mar. 25, 2014

(54) OPERATING LEVER STRUCTURE FOR VEHICLE SEAT, AND METHOD OF MANUFACTURING OPERATING LEVER STRUCTURE

(71) Applicant: Toyota Boshoku Kabushiki Kaisha, Kariya (JP)

(72) Inventors: Akira Yamazaki, Nagoya (JP); Yoshitaka Tomonari, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 18 days.

(21) Appl. No.: 13/705,450

(22) Filed: Dec. 5, 2012

(65) Prior Publication Data

US 2013/0093235 A1 Apr. 18, 2013

Related U.S. Application Data

(63) Continuation of application No. 12/561,551, filed on Sep. 17, 2009, now Pat. No. 8,353,561.

(30) Foreign Application Priority Data

Oct. 10, 2008 (JP) ................................. 2008-264049

(51) Int. Cl.
*A47C 7/02* (2006.01)

(52) U.S. Cl.
USPC .................................. 297/463.1; 297/452.38

(58) Field of Classification Search
USPC ......................................... 297/452.38, 463.1
See application file for complete search history.

(56) References Cited

U.S. PATENT DOCUMENTS

| | | | | |
|---|---|---|---|---|
| 3,957,312 A | * | 5/1976 | Bonnaud | 297/341 |
| 4,248,479 A | * | 2/1981 | Toda | 297/354.12 |
| 4,740,035 A | * | 4/1988 | Kazaoka et al. | 297/452.62 |
| 4,786,109 A | * | 11/1988 | Toya | 297/354.12 |
| 4,850,644 A | * | 7/1989 | Kazaoka et al. | 297/325 |
| 4,973,105 A | * | 11/1990 | Itou | 297/344.12 |
| 5,288,133 A | * | 2/1994 | Mizushima et al. | 297/452.38 |
| 5,529,376 A | * | 6/1996 | Jovan et al. | 297/257 |
| 5,618,059 A | * | 4/1997 | Kim | 280/805 |
| 5,772,283 A | * | 6/1998 | Yoshida et al. | 297/452.38 |
| 5,879,055 A | * | 3/1999 | Dishner et al. | 297/452.38 |
| 6,149,241 A | * | 11/2000 | Waku et al. | 297/463.2 |
| 6,585,321 B1 | * | 7/2003 | Taguchi et al. | 297/344.1 |
| 6,588,850 B2 | * | 7/2003 | Matsuo | 297/473 |

(Continued)

FOREIGN PATENT DOCUMENTS

| | | | | |
|---|---|---|---|---|
| JP | 10-278736 | 10/1998 | | |
| WO | 2007/086466 | 8/2007 | | |
| WO | WO-2007/086466 | * | 8/2007 | B60N 2/16 |

*Primary Examiner* — David E Allred
(74) *Attorney, Agent, or Firm* — Greenblum & Bernstein P.L.C.

(57) ABSTRACT

In an operating lever structure for a vehicle seat in which an opening through which a seat belt extends is provided adjacent to a seat cushion lifting and lowering mechanism and a fixed end portion of the seat belt is connected to a seat cushion frame, a lifter lever includes a plate-like extending portion that is coupled to the lifting and lowering mechanism and a protrusion portion. The plate-like extending portion extends toward a front of the seat. The protrusion portion extends from the front end of the plate-like extending portion toward the outside in the seat width direction. The protrusion portion protrudes from an outer shield through a first exposing port of the outer shield, installed to a side portion of the seat cushion.

3 Claims, 5 Drawing Sheets

(56) References Cited

U.S. PATENT DOCUMENTS

| | | |
|---|---|---|
| 7,938,490 B2 | 5/2011 | Ishijima et al. |
| 7,959,229 B2 | 6/2011 | Ishijima et al. |
| 8,162,404 B2 | 4/2012 | Ueda |
| 2002/0050730 A1* | 5/2002 | Kondo et al. .............. 297/217.3 |
| 2009/0026791 A1* | 1/2009 | Ishijima et al. ............ 296/65.18 |
| 2009/0026825 A1* | 1/2009 | Ishijima et al. ............... 297/358 |
| 2009/0051202 A1* | 2/2009 | Ozeki et al. .................... 297/341 |
| 2009/0267397 A1* | 10/2009 | Kubota .................... 297/344.15 |
| 2010/0109406 A1* | 5/2010 | Ueda ............................ 297/358 |
| 2012/0313408 A1* | 12/2012 | Nagata et al. .............. 297/216.1 |

\* cited by examiner

OPERATING LEVER STRUCTURE FOR VEHICLE SEAT, AND METHOD OF MANUFACTURING OPERATING LEVER STRUCTURE

CROSS-REFERENCE OF RELATED APPLICATIONS

The present application is a continuation of U.S. application Ser. No. 12/561,551 filed Sep. 17, 2009, the disclosure of which incorporated herein by reference in its entirety.

INCORPORATION BY REFERENCE

The disclosure of Japanese Patent Application No. 2008-264049 filed on Oct. 10, 2008 including the specification, drawings and abstract is incorporated herein by reference in its entirety.

BACKGROUND OF THE INVENTION

1. Field of the Invention

The invention relates to an operating lever structure for a vehicle seat installed in a vehicle, the operating lever structure being operated by an occupant when the position of a seat cushion or the position of a seat back is changed. More specifically, the invention relates to an operating lever structure for a vehicle seat, in which an opening through which a seat belt extends is provided adjacent to a lifting and lowering mechanism that changes the vertical position of the seat cushion, and a fixed end portion of the seat belt is connected to a frame of the seat cushion.

2. Description of the Related Art

A vehicle seat installed in a vehicle includes components, such as a seat cushion and a seat back. An occupant is seated on the seat cushion. The seat back serves as a back rest for the seated occupant. The vehicle seat includes a seat belt that holds the body of the occupant in the seat to improve safety in the event of a crash, or the like. In addition, there is known a seat belt in which a fixed end portion of the seat belt is connected to a frame of a seat cushion so as to reduce a variation in withdrawal length of the belt even when the seat cushion is slid in the longitudinal direction (for example, see Japanese Patent Application Publication No. 10-278736 (JP-A-10-278736)).

Incidentally, some known vehicle seats allow the positions of the above described components to be selectively changed by an occupant. That is, some known vehicle seats allow the vertical position of the seat cushion to be changed by lifting and lowering operation and also allow the back rest position of the seat back to be changed by reclining operation. Note that these operations for changing the positions are carried out by a seat cushion lifting and lowering lever (hereinafter, referred to as lifter lever) and a seat back reclining lever (hereinafter, referred to as reclining lever), and these lifter lever and reclining lever are arranged at a side portion of the seat cushion. In addition, in terms of appearance, or the like, a synthetic resin shielder (hereinafter, referred to as outer shield) is installed to the side portion of the seat cushion, at which the lifter lever and the reclining lever are arranged. Portions of the lifter lever and reclining lever are exposed outside from the outer shield so that the lifter lever and the reclining lever are operable.

If the lifting and lowering mechanism for lifting and lowering the seat cushion is installed onto the frame to which the fixed end portion of the seat belt is connected, there is a problem that it is difficult to ensure space for arranging the lifter lever because the opening through which the seat belt extends and the lifting and lowering mechanism are located adjacent to each other. In addition, installing the outer shield to the side portion of the seat cushion is carried out while checking whether the lifter lever and reclining lever attached beforehand are exposed through two exposing ports formed in the outer shield. Thus, when the outer shield is installed to the side portion of the seat cushion while checking whether the lifter lever is exposed through the exposing port of the outer shield and whether the reclining lever is exposed through the exposing port of the outer shield at the same time, high installation accuracy is required for this installation work. As a result, installation work becomes complicated, and it is inconvenient in terms of workability.

SUMMARY OF THE INVENTION

The invention ensures space for arranging a lifter lever (seat cushion lifting and lowering lever) for carrying out lifting and lowering operation of a lifting and lowering mechanism, which changes the vertical position of a seat cushion, in an operating lever structure for a vehicle seat in which an opening through which a seat belt extends is provided adjacent to the lifting and lowering mechanism and a fixed end portion of the seat belt is connected to a frame of the seat cushion. In addition, the invention improves workability for installing an outer shield (shielder).

A first aspect of the invention provides an operating lever structure for a vehicle seat in which an opening through which a seat belt extends is provided adjacent to a lifting and lowering mechanism that changes a vertical position of a seat cushion by lifting or lowering the seat cushion, and a fixed end portion of the seat belt is connected to a frame of the seat cushion. The operating lever structure includes: a lifting and lowering lever that is used for lifting and lowering operation of the lifting and lowering mechanism; a reclining lever that is used for reclining operation so as to change a back rest position of a seat back by reclining the seat back; and a shielder that is installed so as to cover a side portion of the seat cushion in a state where the reclining lever and the lifting and lowering lever are operably exposed outside. The shielder has a first exposing port that is opened toward an outer side in a seat width direction of the vehicle seat to allow the lifting and lowering lever to be inserted and a second exposing port that is opened toward a front of the vehicle seat to allow the reclining lever to be inserted. The lifting and lowering lever includes a plate-like extending portion, of which one end portion is coupled to the lifting and lowering mechanism and the other end portion extends toward the front of the vehicle seat, and a protrusion portion that extends from the other end portion of the plate-like extending portion toward the outer side in the seat width direction and is inserted and exposed through the first exposing port.

In the above aspect, the opening through which the seat belt extends is provided adjacent to the lifting and lowering mechanism, and the fixed end portion of the seat belt is connected to the frame of the seat cushion. Thus, even when it is difficult to ensure space for arranging the lifting and lowering lever, it is possible to arrange the lifting and lowering lever so that the lifting and lowering lever is operably exposed outside.

A second aspect of the invention provides a method of manufacturing an operating lever structure for a vehicle seat in which an opening through which a seat belt extends is provided adjacent to a lifting and lowering mechanism that changes a vertical position of a seat cushion by lifting or lowering the seat cushion, and a fixed end portion of the seat belt is connected to a frame of the seat cushion. The operating lever structure includes: a lifting and lowering lever that is used for lifting and lowering operation of the lifting and lowering mechanism; a reclining lever that is used for reclining operation so as to change a back rest position of a seat back by reclining the seat back; and a shielder that is installed so as to cover a side portion of the seat cushion. The shielder has a first exposing port that is opened toward an outer side in a seat width direction of the vehicle seat and through which the lifting and lowering lever protrudes from the shielder, and a second exposing port that is opened toward a front of the vehicle seat and through which the reclining lever protrudes from the shielder. The method according to the second aspect includes: inserting the reclining lever through the second exposing port and installing a first portion of the shielder to the side portion of the seat cushion; and inserting the lifting and lowering lever through the first exposing port and installing a second portion of the shielder to the side portion of the seat cushion.

According to the operating lever structure for a vehicle seat, when the shielder is installed, an installation worker initially may only pay attention to insertion of the reclining lever through the second exposing port while installing the first portion of the shielder to the side portion of the seat cushion, and, subsequently, the installation worker may only pay attention to insertion of the lifting and lowering lever through the first exposing port while installing the second portion of the shielder to the side portion of the seat cushion.

Thus, when the lifting and lowering lever and the reclining lever are operably exposed outside while the shielder is installed to the side portion of the seat cushion, the installation worker is not required to check whether both the lifting and lowering lever and the reclining lever protrude from the shielder at the same time. This can reduce the workload of the installation worker. Thus, it is possible to improve workability for installing the shielder.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
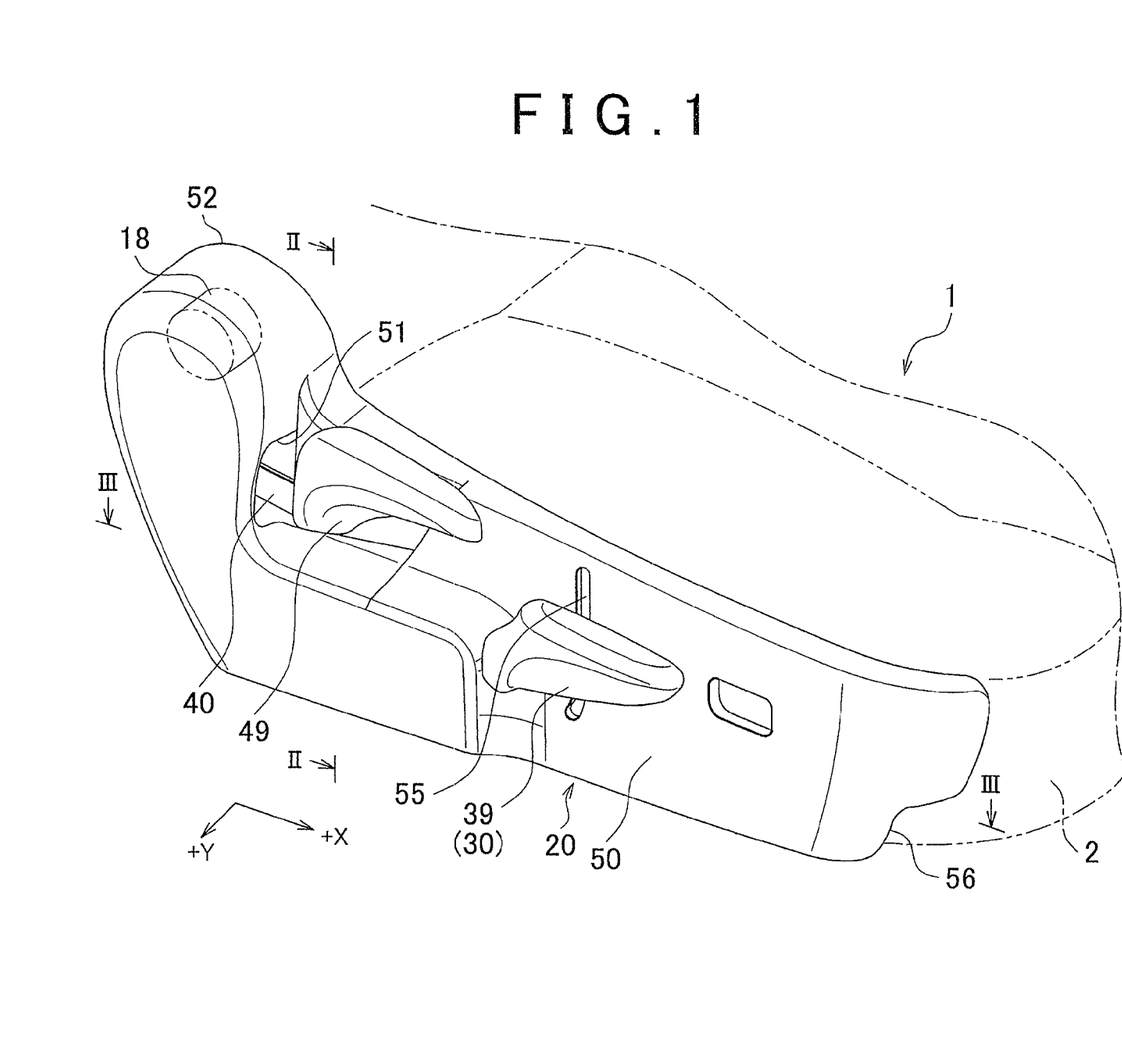
FIG. 1 is a perspective view that shows an operating lever structure for a vehicle seat, which is installed at a side portion of a seat cushion, according to an embodiment.
Figure 2:
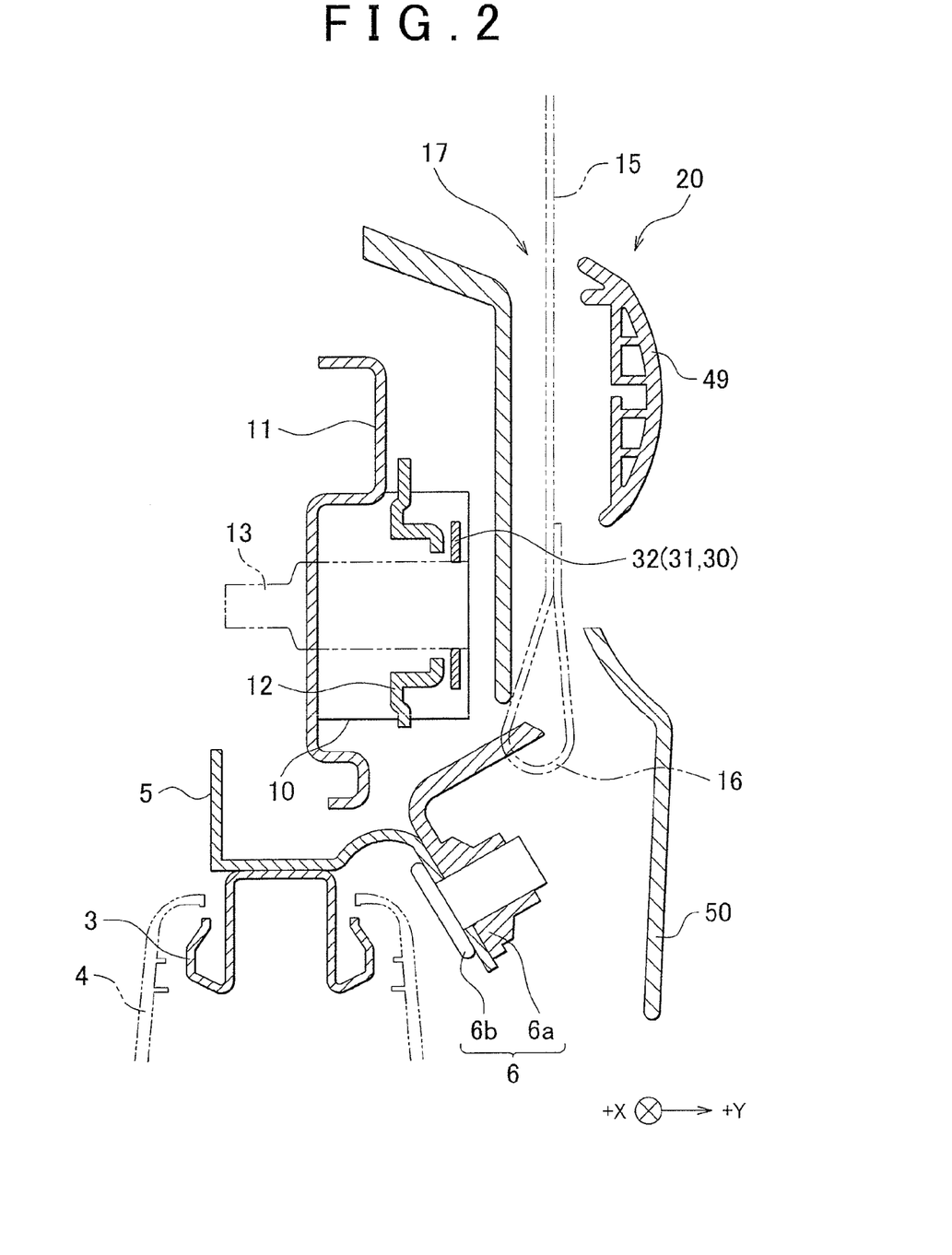
FIG. 2 is a cross-sectional view of the operating lever structure for a vehicle seat, taken along the line II-II in FIG. 1.
Figure 3:
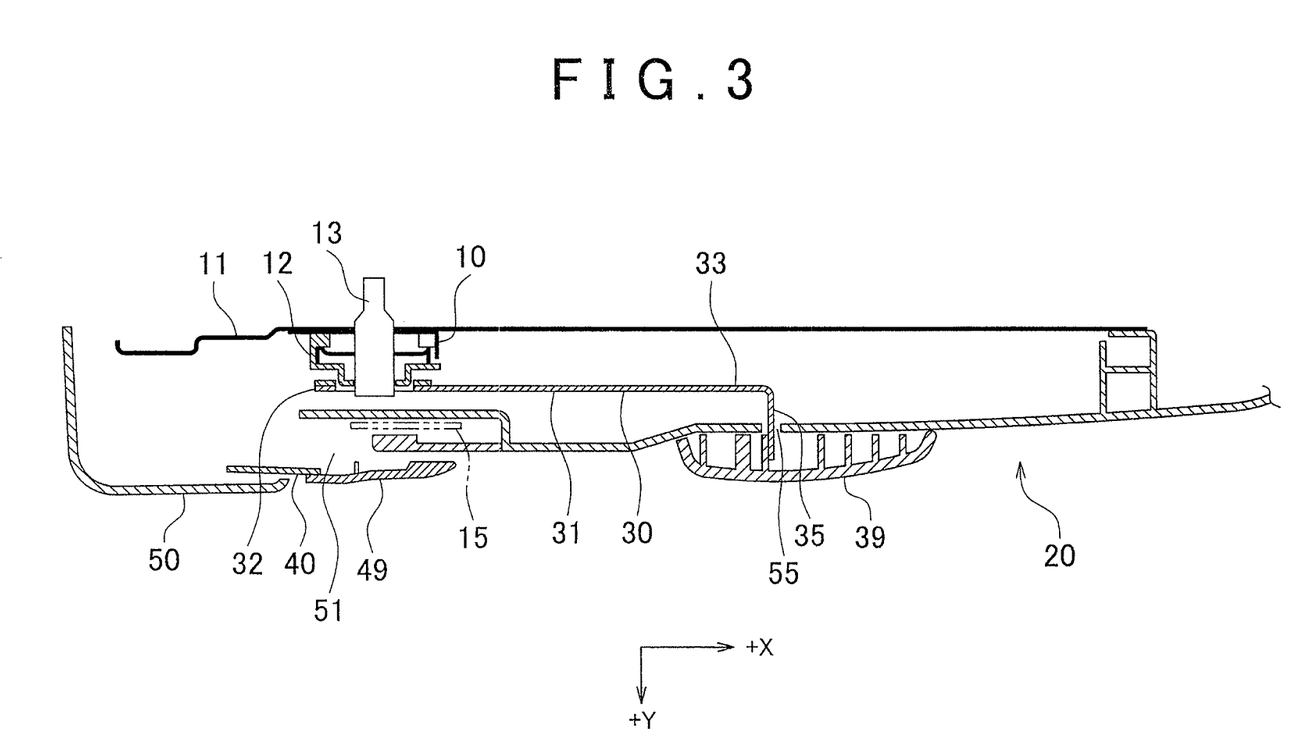
FIG. 3 is a cross-sectional view of the operating lever structure for a vehicle seat, taken along the line III-III in FIG. 1.

Hereinafter, an embodiment of the invention will be described with reference to the accompanying drawings. FIG. 1 is a perspective view that shows an operating lever structure 20 for a vehicle seat 1, which is installed at a side portion of a seat cushion, according to the embodiment. FIG. 2 is a cross-sectional view of the operating lever structure 20 for the vehicle seat 1, taken along the line II-II in FIG. 1. FIG. 3 is a cross-sectional view of the operating lever structure for the vehicle seat, taken along the line III-III in FIG. 1. The vehicle seat 1 is installed in a vehicle, such as an automobile, and, although not specifically shown in the drawings, the vehicle seat 1 includes a seat cushion 2, a seat back, a head rest, an arm rest, and the like. The vehicle seat 1 is able to change the position of the seat cushion 2 and the position of the seat back. That is, as shown in FIG. 2 and FIG. 3, the seat cushion 2 includes a lifting and lowering mechanism 10 that lifts or lowers the seat cushion 2 to change the vertical position of the seat cushion 2. In addition, the seat back includes a reclining mechanism 18 that reclines the seat back to change the back rest position of the seat back.

The lifting and lowering mechanism 10 and the reclining mechanism 18 are installed at the side portion of the seat cushion 2 as shown in FIG. 1 to FIG. 3. Specifically, the lifting and lowering mechanism 10 is installed onto a lower arm 11 via a bracket 12. In addition, although not specifically shown in the drawing, the reclining mechanism 18 is also installed onto the lower arm 11 via an appropriate bracket. In addition, as shown in FIG. 2, the vehicle seat 1 is formed so that, in a state where an opening 17 through which a seat belt 15 extends is located adjacent to the lifting and lowering mechanism 10, a fixed end portion 16 of the seat belt 15 is connected to a frame 5 of the seat cushion 2. Specifically, the fixed end portion 16 of the seat belt 15 is connected to the frame 5 via a connecting member 6 (6a, 6b). The frame 5 is located below a position at which the lifting and lowering mechanism 10 is installed, and is fixed to an upper rail 3. Note that the upper rail 3 is slidable in the longitudinal direction with respect to a lower rail 4 fixed to a vehicle body, and the fixed end portion 16 of the seat belt 15 is slidable in the longitudinal direction accordingly. That is, the fixed end portion 16 of the seat belt 15 slides in the longitudinal direction as the seat cushion 2 slides in the longitudinal direction.

Incidentally, in the vehicle seat 1, in order to operate the above described lifting and lowering mechanism 10 and reclining mechanism 18, the operating lever structure 20 is provided at the side portion of the seat cushion 2. That is, as shown in FIG. 1 to FIG. 3, the operating lever structure 20 includes a lifter lever 30, a reclining lever 40 and an outer shield 50. The lifter lever 30 serves as a seat cushion lifting and lowering lever used for lifting and lowering operation of the lifting and lowering mechanism 10. The reclining lever 40 serves as a seat back reclining lever used for reclining operation of the reclining mechanism 18. The outer shield 50 serves as a shielder that is installed so as to cover the side portion of the seat cushion 2. Here, the operating lever structure 20 is installed at the side portion of the seat cushion 20 after the lifting and lowering mechanism 10 and the reclining mechanism 18 are installed at the side portion of the seat cushion 2. Installation is conducted in order that the lifter lever 30 and the reclining lever 40 are respectively attached to the corresponding lifting and lowering mechanism 10 and reclining mechanism 18, and then the outer shield 50 is installed to the side portion of the seat cushion 2 so as to cover the side portion of the seat cushion 2 in a state where the lifter lever 30 and the reclining lever 40 are operably exposed outside. That is, the lifter lever 30 and the reclining lever 40 protrude from the outer shield 50. In addition, the outer shield 50 is installed to the side portion of the seat cushion 2 through at least two installation steps. That is, the outer shield 50 is installed to the side portion of the seat cushion 2 through the first installation step in which the outer shield 50 is installed in a first installation direction (−X direction) from the front of the vehicle seat 1 toward the rear of the vehicle seat 1 and the second installation step in which the outer shield 50 is installed in a second installation direction (−Y direction) from the outer side of the vehicle seat 1 toward the inner side of the vehicle seat 1. Note that the second installation direction (direction from the outer side toward the inner side (−Y direction)) in which the outer shield 50 is installed in the second installation step is substantially perpendicular to the first installation direction (direction from the front toward the rear (−X direction)) in which the outer shield 50 is installed in the first installation step.

The lifter lever 30 is used for lifting and lowering operation of the lifting and lowering mechanism 10. One end of the lifter lever 30 is coupled to the lifting and lowering mechanism 10, and the other end thereof is operably exposed outside. That is, as shown in FIG. 3, the lifter lever 30 schematically includes a plate-like extending portion 31 and a protrusion portion 35. The plate-like extending portion 31 is coupled to a rotary shaft 13 of the lifting and lowering mechanism 10. The protrusion portion 35 is operably exposed outside. The plate-like extending portion 31 is formed into a thin-plate rod. One end portion 32 of the plate-like extending portion 31 is coupled to the lifting and lowering mechanism 10, and the other end portion 33 thereof extends in a direction (+X direction) opposite to the first installation direction (−X direction). That is, the plate-like extending portion 31 extends toward the front of the vehicle seat. The protrusion portion 35 is formed by bending an end portion of the plate-like extending portion 31, opposite to the one end portion 31. The protrusion portion 35 extends in a direction (+Y direction) opposite to the second installation direction (−Y direction). That is, the protrusion portion 35 extends toward an outer side in the seat width direction. The protrusion portion 35 is inserted through a first exposing port 55 of the outer shield 50, which will be described later, and is operably exposed outside. Note that, after the protrusion portion 35 is inserted through the first exposing port 55 of the outer shield 50 and is operably exposed outside, a synthetic resin operating knob 39 is attached to the protrusion portion 35 so that it is easy for the seated occupant to grip the operating knob 39.

The reclining lever 40 is used for reclining operation of the reclining mechanism 18. Although the description of a coupling structure with the reclining mechanism 18 is omitted, one end of the reclining lever 40 is coupled to the reclining mechanism 18, and the other end thereof is operably exposed outside. The other end of the reclining lever 40 is formed into a thin-plate rod that extends in a direction (+X direction) opposite to the first installation direction (−X direction). That is, the other end of the reclining lever 40 extends toward the front of the seat. In addition, after the other end of the reclining lever 40 is inserted through the second exposing port 51 of the outer shield 50 and is operably exposed outside, a synthetic resin operating knob 49 is attached to the other end of the reclining lever 40 so that it is easy for the seated occupant to grip the operating knob 49.

Figure 4:
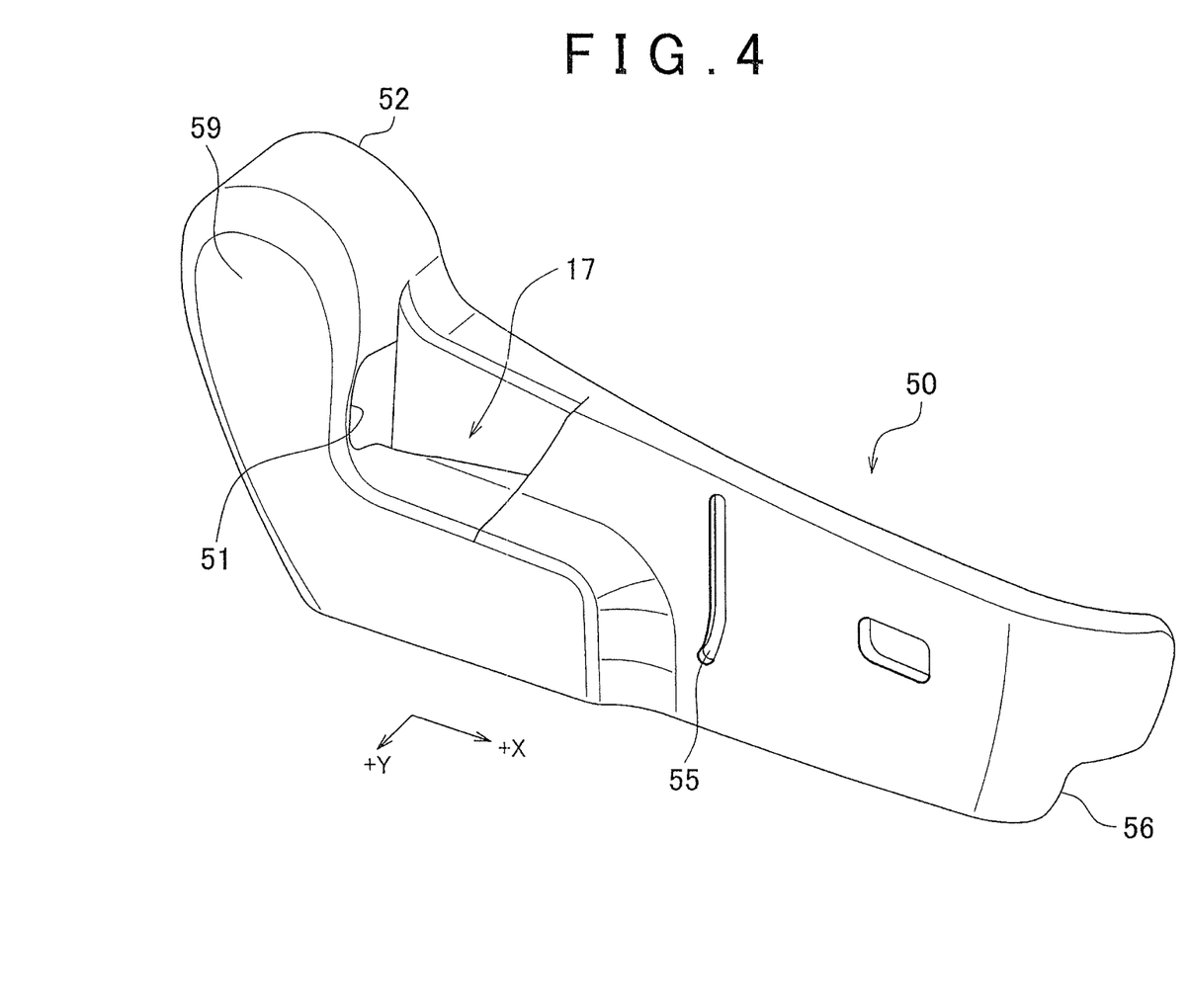
FIG. 4 is a perspective view that only shows an outer shield (shielder) of the operating lever structure for a vehicle seat, shown in FIG. 1.

FIG. 4 is a perspective view that only shows the outer shield 50 of the operating lever structure 20 of the vehicle seat 1 shown in FIG. 1. The outer shield 50 is a molded product made of synthetic resin and is formed so as to cover the side portion of the seat cushion 2. As shown in FIG. 4, the outer shield 50 has the first exposing port 55 and the second exposing port 51. The first exposing port 55 is opened in the second installation direction (−Y direction). The second exposing port 51 is opened in the first installation direction (−X direction). Specifically, as shown in FIG. 3 and FIG. 4, the second exposing port 51 is formed to have an open shape that allows insertion in the longitudinal direction (±X direction) with respect to the vehicle seat 1 at the rear (−X direction) position of the outer shield 50, and the open shape is substantially rectangular. Here, a rear portion of the outer shield 50 is a rear installation portion 52 that is a first portion of the outer shield 50 and is a portion installed to the side portion of the seat cushion 2 in the first installation step when the outer shield 50 is installed to the side portion of the seat cushion 2. In addition, as shown in FIG. 4, the first exposing port 55 is formed to have an open shape that allows insertion in the lateral direction (±Y direction) with respect to the vehicle seat 1 at a middle position of the outer shield 50. The open shape is substantially vertically long, and, more accurately, is formed into a circular arc shape having the rotary shaft 13 of the lifter lever 30 as a rotation center. Here, a front portion of the outer shield 50 is a front installation portion 56 that is a second portion of the outer shield 50 and is a portion installed to the side portion of the seat cushion 2 in the second installation step when the outer shield 50 is installed to the side portion of the seat cushion 2. Note that the opening 17 through which the seat belt 15 extends is located adjacent to the second exposing port 51.

Installation work for installing the thus configured operating lever structure 20 of the vehicle seat 1 to the side portion of the seat cushion 2 is conducted as follows. That an installation worker initially attaches the lifter lever 30 and the reclining lever 40 respectively to the corresponding lifting and lowering mechanism 10 and reclining mechanism 18. After that, the process proceeds to the first installation step and second installation step in which the outer shield 50 is installed. In the first installation step, the installation worker moves the outer shield 50 in the first installation direction (−X direction) to insert the reclining lever 40 through the second exposing port 51 and installs the rear installation portion 52, located at the rear portion of the outer shield 50, to the side portion of the seat cushion 2. In the second installation step subsequent to the first installation step, the installation worker moves the outer shield 50 in the second installation direction (−Y direction) to insert the lifter lever 30 through the first exposing port 55 and installs the front installation portion 56, located at the front portion of the outer shield 50, to the side portion of the seat cushion 2. In this way, the outer shield 50 is installed to the side portion of the seat cushion 2 and, after that, the operating knobs 39 and 49 are attached to the lifter lever 30 and the reclining lever 40 that are operably exposed outside, thus completing the installation work.

According to the thus configured operating lever structure 20 for the vehicle seat 1, the following operations and advantageous effects may be obtained. That is, with the operating lever structure 20 for the vehicle seat 1 according to the embodiment, the outer shield 50 includes the second exposing port 51 that is opened in the first installation direction and the first exposing port 55 that is opened in the second installation direction substantially perpendicular to the first installation direction. In the first installation step, the reclining lever 40 is inserted through the second exposing port 51 and the rear installation portion 52 of the outer shield 50 is installed to the side portion of the seat cushion 2. In the second installation step, the lifter lever 30 is inserted through the first exposing port 55 and the front installation portion 56 of the outer shield 50 is installed to the side portion of the seat cushion 2. Thus, for installing the outer shield 50, in the first installation step, the installation worker may only pay attention to insertion of the reclining lever 40 through the second exposing port 51 while installing the rear installation portion 52 of the outer shield 50 to the side portion of the seat cushion 2, and, in the second installation step, the installation worker may only pay attention to insertion of the lifter lever 30 through the first exposing port 55 while installing the front installation portion 56 of the outer shield 50 to the side portion of the seat cushion 2.

Thus, when the outer shield 50 is installed to the side portion of the seat cushion 2 so that the lifter lever 30 and the reclining lever 40 are operably exposed outside, the installation worker is not required to check whether both the lifter lever 30 and the reclining lever 40 protrude from the outer shield 50 at the same time. This can reduce the workload of the installation worker. Thus, it is possible to improve workability for installing the outer shield 50.

In addition, the lifter lever 30 includes the plate-like extending portion 31, of which the one end portion 32 is coupled to the lifting and lowering mechanism 10 and the other end portion 33 extends in the direction opposite to the first installation direction, and the protrusion portion 35 that extends from the other end portion 33 of the plate-like extending portion 31 in the direction opposite to the second installation direction and is then inserted and exposed through the first exposing port 55. Thus, the one end portion 32 of the plate-like extending portion 31 may be coupled to the lifting and lowering mechanism 10 while the other end portion 33 thereof may be extended in the direction opposite to the first installation direction. Therefore, the protrusion portion 35 may be extended from the other end portion 33 of the plate-like extending portion 31 in the direction opposite to the second installation direction so as to be exposed through the first exposing port 55. In this embodiment, the opening 17 through which the seat belt 15 extends is located adjacent to the lifting and lowering mechanism 10 and the fixed end portion 16 of the seat belt 15 is connected to the frame of the seat cushion 2. Hence, even when it is difficult to ensure space for arranging the lifter lever 30, the lifter lever 30 may be arranged so as to be operably exposed outside.

Note that the operating lever structure of the vehicle seat according to the aspect of the invention is not limited to the above embodiment; it may be appropriately modified without departing from the scope of the invention. For example, the operating lever structure 20 of the vehicle seat 1 according to the embodiment includes the lifter lever 30 used for lifting and lowering operation of the lifting and lowering mechanism 10, the reclining lever 40 used for reclining operation of the reclining mechanism 18, and the outer shield 50 installed so as to cover the side portion of the seat cushion 2. However, the operating lever structure of the vehicle seat according to the aspect of the invention is not limited to this configuration. In addition to these lifter lever 30, reclining lever 40 and outer shield 50, another operating lever used to operate a mechanism for changing the position of an appropriate structural component may be provided.

Figure 5:
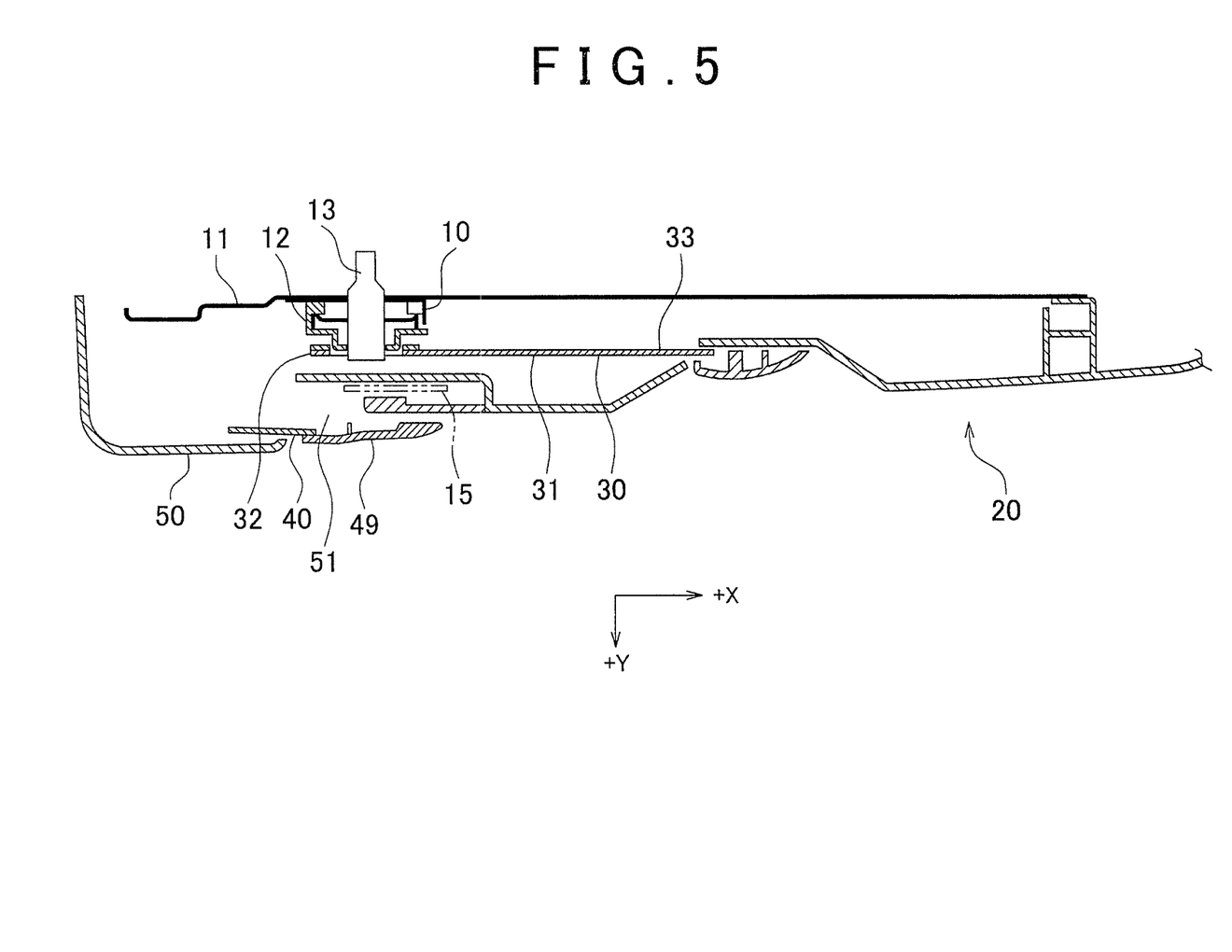
FIG. 5 is a cross-sectional view of the operating lever structure for a vehicle seat, taken along the line III-III in FIG. 1, according to an alternative embodiment.

In addition, the shape of the lifter lever 30, the shape of the outer shield 50 and the method of installing the outer shield 50 are not limited to the above embodiment. As shown in FIG. 5, it is also applicable that the plate-like extending portion 31 of the lifter lever 30 directly protrudes from the outer shield 50 on the front side with respect to the seat belt opening 17, and the operating knob 39 may be attached to the other end portion 33. According to this alternative embodiment, even when no protrusion portion 35 is formed, it is possible to ensure space for arranging the lifter lever 30. In addition, in the case of the present alternative embodiment, only by moving the outer shield 50 in the first installation direction, the outer shield 50 may be installed to the side portion of the seat cushion 2 in position.

In addition, as described in the above embodiment, even when the protrusion portion 35 is provided for the lifter lever 30, the installation procedure of the outer shield 50 is not limited to the method described in the embodiment.

What is claimed is:

1. An operating lever structure for a vehicle seat in which an opening through which a seat belt extends is provided adjacent to a lifting and lowering mechanism that changes a vertical position of a seat cushion by lifting or lowering the seat cushion, and a fixed end portion of the seat belt is connected to a frame of the seat cushion, the operating lever structure comprising:
    a lifting and lowering lever that is used for lifting and lowering operation of the lifting and lowering mechanism;
    a reclining lever that is used for reclining operation to recline a seat back so as to change a back rest position of the seat back, and an operating knob attached to an end of the reclining lever; and
    a shielder that is installed so as to cover a side portion of the seat cushion in a state where the reclining lever and the lifting and lowering lever are operably exposed outside the shielder, wherein
    the shielder has a first exposing port that is opened toward an outer side in a seat width direction of the vehicle seat to allow the lifting and lowering lever to be inserted and a second exposing port that is opened toward a front of the vehicle seat to allow the reclining lever to be inserted, and
    the lifting and lowering lever includes a plate shaped extending portion, of which one end portion is coupled to the lifting and lowering mechanism and the other end portion extends toward the front of the vehicle seat, and a protrusion portion that extends from the other end portion of the plate shaped extending portion toward the outer side in the seat width direction and that protrudes from the shielder through the first exposing port,
    wherein the opening through which the seat belt extends is formed in the shielder, is located in the seat width direction between a portion of the shielder and the operating knob, and is located adjacent to and continuous with the second exposing port.

2. The operating lever structure for a vehicle seat according to claim 1, wherein
    the first exposing port is located forwardly, toward the front of the vehicle seat, of the opening through which the seat belt extends.

3. The operating lever structure for a vehicle seat according to claim 1, wherein
    the first exposing port is located forwardly, toward the front of the vehicle seat, of the opening through which the seat belt extends and the second exposing port.

* * * * *